Feb. 28, 1928.
R. D. MAILEY
SEAL
Original Filed Oct. 16, 1923
1,660,649
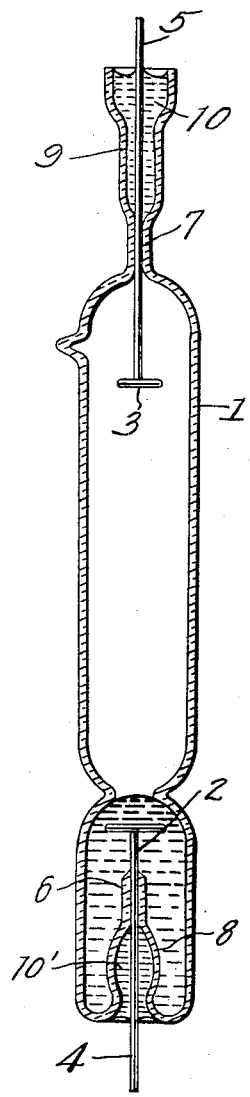
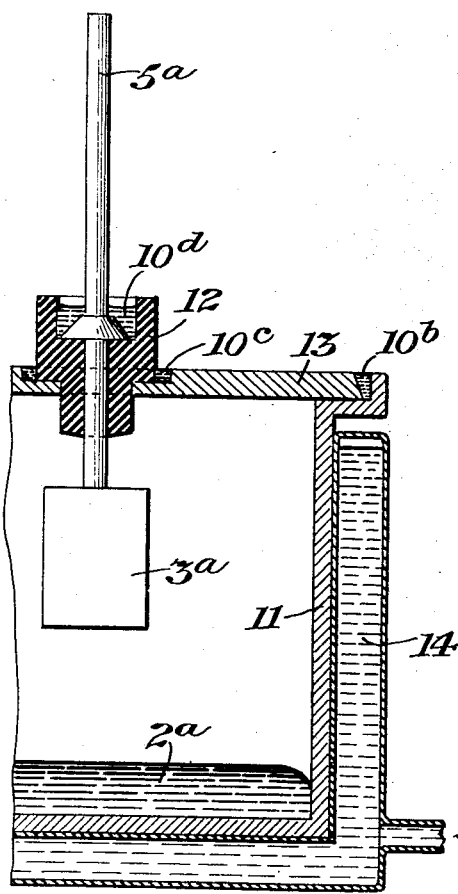
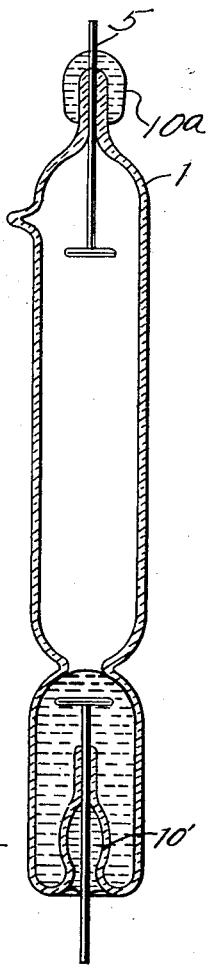
INVENTOR
Roy D. Mailey
BY
Thos. D. Brown
HIS ATTORNEY Patented Feb. 28, 1928.

1,660,649

UNITED STATES PATENT OFFICE.

ROY D. MAILEY, OF EAST ORANGE, NEW JERSEY, ASSIGNOR TO COOPER HEWITT ELECTRIC COMPANY, A CORPORATION OF NEW JERSEY.

SEAL.

Application filed October 16, 1923, Serial No. 668,932. Renewed April 28, 1927.

The present invention relates to hermetic seals useful in the arts generally.

I have discovered that a ductile element, or a compound, having the property, when in molten or fused condition, of wetting glass and metal is useful for the purpose of hermetically sealing a lead wire to and through the wall of a glass or fused quartz or metal container and that, among others, one such material is silver chloride (AgCl). The use of such a material greatly facilitates the manufacture of such apparatus in that it no longer is necessary to subject the glass and the lead wire to be joined thereto to high temperatures for long periods of time nor is it necessary to work them together at such high temperatures. Thus the losses attendant upon such high temperatures operations due to a volatilization of the glass or of the glass and the metal is avoided by the use of sealing materials. Silver chloride (AgCl) has a relatively low fusing point and the property of wetting glass and metal when molten or fused thereto and of hermetically maintaining the seal thus effected when solid due to the fact that it is sufficiently ductile to adjust itself to and compensate for the volume changes of the joined surfaces incident to heating and cooling.

I have also discovered that the amorphous state which fused silver chloride assumes on cooling makes that compound particularly adapted for a sealing because of its strength, its co-efficient of expansion, its wax-like adhering quality and its fusing temperature.

The invention is particularly useful in connection with vapor electric apparatus having a fused quartz container and wherein there is wide diversity of co-efficients of thermal expansion between the quartz wall and an electrode lead wire passing through said wall, although the invention is equally applicable in devices where the co-efficients of thermal expansion of the wall and the member to be hermetically joined thereto, either a lead wire or another wall, are substantially equal and, also, to apparatus generally where the co-efficients of expansion of the members to be hermetically joined play no part in the operation of the apparatus.

By way of illustration I have shown my invention as applied to a mercury vapor lamp and a mercury vapor rectifier, but it is to be understood that it is useful in connection with other types of evacuated electric apparatus or to apparatus generally wherein hermetic seals or joints are requisite parts of the walls of such apparatus.

In the accompanying drawings, Figure 1 is a vertical section of a mercury vapor lamp having a fused quartz container in which my new sealing material is utilized in the form of plugs for the positive and negative electrodes; Figure 2 is a similar view of a lamp in which one electrode is sealed in the container by an exposed layer of sealing material and another electrode is sealed in by a plug and Figure 3 is a vertical section of a portion of a rectifier having a metal container showing the sealing material as used to seal the cover to the container; to seal an insulated bushing into the cover; and to seal the electrode lead into the insulated bushing.

Referring to the drawings, 1 is a container of quartz, glass, etc. of a mercury vapor lamp, the mercury electrode thereof being shown at 2 and the positive electrode thereof appearing at 3. The electrodes 2 and 3 are provided with the usual lead wires 4 and 5 which pass through the openings 6 and 7 in the wall of the container. The container wall exterior to the portions 6 and 7 is flared out as shown at 8 and 9 to receive a suitable sealing material, 10, for sealing the openings 6 and 7 with the lead wires 4 and 5 in said openings, said sealing material being poured into place in a molten condition and allowed to cool.

The sealing material 10 should be an element or compound that wets the surfaces to be hermetically joined and which elements or compounds when solid are sufficiently ductile to adjust themselves to the volume changes of the joined surfaces incident to heating and cooling. One such material is silver chloride (AgCl). Another suitable material is sulphur.

By virtue of these sealing materials, such as silver chloride, the manufacture of the apparatus is facilitated in that, for one thing, it is not necessary to fuse the joint of the metal, 5, and the glass, 7, at the point, 7, or to be so particular in the tightness of fit as is the case when ground joints between the metal and glass are utilized, although the invention is applicable to ground joints where they are desired.

In Figure 2 the sealing material, 10, such as silver chloride, is shown applied to seal the wire 5 to the container 1 in an exposed position, being laid on the container 1 and the wire 5.

In Figure 3 the container of the rectifier is shown at 11, having a mercury cathode $2^a$ therein and an anode $3^a$ mounted on a lead wire $5^a$ passing through a bushing 12 under a cover 13 for the container 11. A cooling jacket for the rectifier is shown at 14. The cover 13 is hermetically joined or sealed to the container 11 by a silver chloride joint $10^b$, and the bushing 12 is joined or sealed to the cover 13 by a silver chloride joint $10^c$ and the lead wire $5^a$ is joined to the bushing 12 by a silver chloride joint $10^d$. It will, of course, be understood that any other member of a rectifier can be hermetically sealed through the wall of the rectifier container 11—13 by the use of silver chloride after the manner shown and described above.

By virtue of the use of a sealing material having the property of ductility when cold and of wetting glass, vitreous material and metals when hot, I am able in a single sealing step to produce hermetic seals between materials having wide differences in coefficients of thermal expansion as well as between materials having no such difference.

I claim as my invention:

1. In electric apparatus a seal between lead-ins and vitreous walls through which such lead-ins pass comprising fused silver chloride.

2. A seal between glass and metal comprising fused silver chloride.

3. A seal between fused quartz and metal comprising fused silver chloride.

4. A seal between glass and metal composed of amorphous silver chloride.

5. A seal between the lead-ins of electric lamps and similar vacuum devices and a fused quartz wall in such device comprising fused silver chloride.

Signed at Hoboken in the county of Hudson and State of New Jersey this 16 day of October, A. D. 1923.

ROY D. MAILEY.